United States Patent
Caison et al.

(10) Patent No.: US 10,063,429 B2
(45) Date of Patent: Aug. 28, 2018

(54) SYSTEMS AND METHODS FOR OPTIMIZING COMPUTER NETWORK OPERATIONS

(71) Applicant: THE KEYW CORPORATION, Hanover, MD (US)

(72) Inventors: Chad Caison, Ownings, MD (US); Carol O. Lloyd, Crofton, MD (US); Eamon Walsh, Odenton, MD (US); Tejas Hemant Patel, Raleigh, NC (US); Chris Fanning, Annapolis, MD (US)

(73) Assignee: THE KEYW CORPORATION, Hanover, MD (US)

( * ) Notice: Subject to any disclaimer, the term of this patent is extended or adjusted under 35 U.S.C. 154(b) by 578 days.

(21) Appl. No.: 14/249,071

(22) Filed: Apr. 9, 2014

(65) Prior Publication Data
US 2015/0295751 A1 Oct. 15, 2015

(51) Int. Cl.
*G06F 15/16* (2006.01)
*H04L 12/24* (2006.01)
(Continued)

(52) U.S. Cl.
CPC .......... *H04L 41/28* (2013.01); *H04L 63/0227* (2013.01); *H04L 63/0281* (2013.01);
(Continued)

(58) Field of Classification Search
CPC . H04L 63/0227; H04L 67/38; H04L 63/0209; H04L 67/34; H04L 63/18;
(Continued)

(56) References Cited

U.S. PATENT DOCUMENTS

| 9,667,610 B2 * | 5/2017 | Theebaprakasam .... H04L 63/08 |
| 2012/0030670 A1 * | 2/2012 | Vijay .................. G06F 9/45558 |
| | | 718/1 |

(Continued)

*Primary Examiner* — Moustafa M Meky
*Assistant Examiner* — Kidest Mendaye
(74) *Attorney, Agent, or Firm* — Morrison & Foerster LLP

(57) ABSTRACT

Disclosed herein are systems and methods to integrate and manage a computer network operations (CNO) infrastructure. A framework may include CNO applications that are used to find a target computer system, breach the target, extract data therefrom and analyze the data. A CNO organization in a secure network can use the framework to maintain, manage and monitor CNO applications in an unsecured network without compromising security from counter-attacks. The framework remains engaged with targeted computer systems during routine maintenance, management and monitoring processes to mitigate loss of mission opportunities. The framework utilizes virtual instances to provision CNO capabilities for missions operations that couple the secure and unsecured networks in an asynchronous manner while allowing bidirectional communications between the framework and computers on their respective network. Consequently, the framework secures a CNO infrastructure while mitigating loss mission opportunities and vulnerabilities from adversaries.

28 Claims, 6 Drawing Sheets

(51) Int. Cl.
*H04L 29/06* (2006.01)
*H04L 29/08* (2006.01)
*H04L 12/26* (2006.01)

(52) U.S. Cl.
CPC .......... *H04L 63/1441* (2013.01); *H04L 43/10* (2013.01); *H04L 67/1002* (2013.01)

(58) Field of Classification Search
CPC ... H04L 67/1097; H04L 63/04; H04L 63/123; H04L 63/20; H04L 63/126; H04L 67/10; H04L 63/105
See application file for complete search history.

(56) References Cited

U.S. PATENT DOCUMENTS

| | | | |
|---|---|---|---|
| 2013/0061293 A1* | 3/2013 | Mao | G06F 21/53 |
| | | | 726/4 |
| 2013/0097283 A1* | 4/2013 | Menoher | H04L 63/105 |
| | | | 709/217 |
| 2013/0152076 A1* | 6/2013 | Patel | G06F 9/45558 |
| | | | 718/1 |
| 2013/0275447 A1* | 10/2013 | Ben-Tsion | G06F 17/30079 |
| | | | 707/756 |
| 2014/0237464 A1* | 8/2014 | Waterman | G06F 8/65 |
| | | | 717/172 |
| 2015/0264056 A1* | 9/2015 | Mevec | G06F 11/1448 |
| | | | 726/3 |
| 2015/0277953 A1* | 10/2015 | Xu | G06F 9/45558 |
| | | | 718/1 |

* cited by examiner

SYSTEMS AND METHODS FOR OPTIMIZING COMPUTER NETWORK OPERATIONS

FIELD OF THE INVENTION

This invention relates to systems and methods for optimizing computer network operations in cyber warfare. In particular, virtual environments are deployed to securely contain disparate capabilities used in computer network operations to minimize interruptions otherwise caused by maintaining, managing and monitoring these capabilities.

BACKGROUND OF THE INVENTION

Cyber warfare refers to gaining access to computer systems to cause disruptions, gather intelligence, or the like. Computer network operations (CNO) are actions taken by organizations to protect, defend and respond to cyber threats and adversaries. Accordingly, CNO involves using a complex hardware and software infrastructure to gain information superiority over adversaries and to deny adversaries this same superiority.

Computer network operations leverage information in different ways to exploit target systems. For example, offensive computer operations (OCO) include an ability to disrupt or destroy target computer systems and information capabilities. Computer network defense (CND) refers to leveraging information to prevent, identify, analyze, monitor, and respond to cyber-attacks. Computer network exploitation (CNE) is related to OCO and refers to gathering necessary information to proliferate effective attacks.

Specifically, offensive computer operations generate intelligence by collecting data from targeted computer systems and analyze the collected data to determine information of interest. This form of intelligence gathering utilizes technology from various information technologies (IT) such as computer science, computer forensics and vulnerability research. Computer forensics refers to examining digital media to identify, preserve, recover, analyze and present information extracted therefrom. Vulnerability research is a practice in computer security to identify weaknesses in a computer system that can be exploited by adversaries.

Organizations that conduct CNO must develop a robust and diverse infrastructure of capabilities, including hardware and software. CNO infrastructure must withstand various demands that include maintaining, managing and monitoring disparate capabilities. In conventional systems, several CNO applications are utilized to conduct specific OCO processes. For example, different applications may be used to find a target computer system, breach the target, collect data and analyze the collected data. Accordingly, organizations use diverse capabilities to effectively conduct computer network operations.

CNO organizations quickly become inundated with hardware, software, complex management practices and information such as metadata. These issues are further exacerbated with routine updates or maintenance of individual capabilities. Unfortunately, time spent maintaining properly operating capabilities means that less time is spent actually conducting network operations because of frequent interruptions and downtime.

Conventional CNO organizations routinely experience a loss of mission opportunity, which refers to losing critical opportunities to collect and analyze data from target computer systems due to interruptions caused by routine maintenance, management and monitoring. In addition, conventional CNO organizations must increase personnel to troubleshoot each distinct capability. Consequently, CNO organizations are plagued with overhead costs due to increased staffing and training required for diverse capabilities that must be made available for conducting effective mission operations. Moreover, maintaining a library of capabilities operated by increasing staff creates security gaps that can be exploited by adversaries. For example, deploying routine processes for CNO applications may expose a CNO infrastructure to adversaries because these processes necessarily utilize unsecured networks to access target computer systems. Moreover, expertise for each capability is frequently isolated to a few individuals that may leave the organization and/or assist adversaries. Thus, a need exists for a system that optimizes a CNO infrastructure to securely permit maintenance, management and monitoring of diverse capabilities in a harmonized manner.

SUMMARY OF THE INVENTION

Disclosed herein are systems and methods to integrate and manage a computer network operations (CNO) infrastructure. Central to this disclosure are solutions to threats faced by CNO organizations, which include lost mission opportunities and vulnerability to counter-attacks. These threats result because CNO organizations experience both a training burden and a maintenance burden. For example, mission opportunities are lost because of interruptions and downtime caused by routine maintenance, management and monitoring. Vulnerabilities to counter-attacks occur because a secure CNO infrastructure is exposed during routine communications with CNO applications residing on an unsecured network. The CNO applications reside on unsecured networks to communicate with targeted computer systems.

CNO infrastructures use diverse capabilities, such as disparate hardware and software applications. A capability typically completes a process of a mission operation such as finding a target, breaching the target, extracting data from the target, or analyzing the extracted data. Unlike conventional systems, the disclosed systems and methods can maintain, manage and monitor two or more capabilities simultaneously to ensure successful mission operations. Further, a single user interface can be used to access the two or more capabilities without requiring expert knowledge for each specific capability.

Updating CNO applications in conventional systems requires taking the applications offline, which may interrupt critical mission operations. These problems are compounded by CNO applications that reside in unsecured network, which are maintained, managed and monitored from a secure network. Consequently, CNO infrastructures risk attacks from adversaries during maintenance, management and monitoring of CNO applications on an unsecured network because adversaries also reside on the unsecured networks.

The disclosed systems and methods solve the abovementioned problems by provisioning and managing disparate capabilities in a unified, centralized, harmonized and secure manner that mitigates loss of mission opportunities and risks of counter-attacks by adversaries. A framework may be embodied as an appliance residing at a junction between a secure network and an unsecured network. A CNO infrastructure resides on the secure network and a target resides on the unsecured network.

The disclosed framework has components on the secure side and the unsecured side. Computers of CNO infrastructure can perform bidirectional communications with the secure side component of the framework. The unsecured side component of the framework can perform bidirectional communicates with a target. To prevent lost opportunities and counter attacks, the framework creates containers, referred to as instances, which include the secure-side and unsecure-side components of the framework. The instances provide logical divisions of CNO capabilities used for computer network operations. The secure-side component of the framework conducts processes in a unidirectional manner with the unsecure-side component to maintain, manage and monitor CNO applications. The CNO applications also include secure-side and unsecure-side components. The framework mitigates counter-attacks by restricting access of components on the unsecure-side from components on the secure-side. Hence, the disclosed framework protects against counter computer network exploitation (CNE) from adversaries.

The disclosed framework is unified because instances act as containers for multiple capabilities used in a mission operation. The framework is centralized because a single interface can access and control all CNO capabilities by using the same processes. Centralized monitoring facilitates awareness by a CNO organization about its infrastructure, at all times. Finally, the framework provides a range of testing tools that can be used before capabilities are deployed, to ensure that the capabilities function optimally. Thus, the disclosed systems and methods provided a harmonized and secure way to maintain, manage and monitor two or more CNO capabilities, to mitigate loss of mission opportunities and vulnerabilities from counterattacks.

In some embodiments, a network device includes a first network that executes a first virtual environment and that enables bidirectional communications with a first computer, and a second network that executes a second virtual environment and that enables bidirectional communications with a second computer. The network device also includes a unidirectional communications channel between the first network and the second network, and the unidirectional communications channel enables the first virtual environment to communicate with the second virtual environment.

In some embodiments, the unidirectional communications channel includes a data proxy, and a data receiver, wherein the data proxy routes communications to the data receiver. In some embodiments, the unidirectional communications channel is a first unidirectional communications channel, and the network device includes a second unidirectional communications channel, wherein the first unidirectional communications channel enables transferring data only from the first network to the second network, and the second unidirectional communications channel enables transferring data only from the second network to the first network.

In some embodiments, the first and second unidirectional communications channels communicate asynchronously. In some embodiments, the first computer resides on a secure network and the second computer resides on an unsecured network. In some embodiments, the network device includes a first application that is transmitted from the first computer to the first network and deployed in the first virtual environment, and a second application that is transmitted from the first computer to the second network and deployed in the second virtual environment, wherein the second application is transmitted over the first communications channel. In some embodiments, the first and second applications are components of a single application.

In some embodiments, the second application executes actions to monitor network traffic associated with the second computer. In some embodiments, the first application obtains data from the second application over the second communications channel and transmits the obtained data to the first computer. In some embodiments, the first computer sends an instruction to the second application via the first unidirectional communications channel to monitor network traffic associated with the second computer. In some embodiments, the first virtual environment comprises a memory for storing data collected from the second application. In some embodiments, the bidirectional communications between the first computer and the first virtual environment is performed while the unidirectional coupling between the first network and the second network is maintained.

In some embodiments, the second virtual environment obtains a computer application and an instruction to execute the computer application from the first computer. In some embodiments, the computer application is designated by a user through a graphical user interface provided by the first virtual environment. In some embodiments, the graphical user interface accepts a command to execute the computer application on the second virtual environment. In some embodiments, the computer application, when executing on the second virtual environment, performs at least one of identifying the second computer, breaching the second computer, collecting data from the second computer and analyzing data collected from the second computer.

In some embodiments, the computer application, when running on the second virtual environment, sends a heartbeat signal to the first virtual environment. In some embodiments, the first virtual environment provides a web portal displaying a status of the computer application based on the received heartbeat signal. In some embodiments, the computer application, when running on the second virtual environment, creates output data that is obtained by the first virtual environment and is stored in a memory at the first virtual environment.

In some embodiments, the computer application is a first computer application and its output data is a first output data, and wherein the second virtual environment runs a second computer application that creates a second output data, and the first virtual environment obtains the second output data and provides a user interface displaying the first output data and the second output data.

In some embodiments, the first virtual environment and the second virtual environment are a virtual machine instance provided by a same virtual machine kernel.

In some embodiments, a system includes a first network, a second network, a first unidirectional communications channel that permits data to pass only from the first network to the second network, and a second unidirectional communications channel that permits data to pass only from the second network to the first network, wherein data is communicated between two or more virtual machines on the first network and the second network.

In some embodiments, each virtual machine runs only a single application. In some embodiments, the first network is a secure network and the second network is an unsecured network. In some embodiments, each virtual machine outputs data that is stored in a common memory. In some embodiments, a first application running on a first virtual machine running on the unsecured network collects data from a remote computer, and a second application running on a second virtual machine running on the secure network obtains the collected data from the first application via the second unidirectional communications channel. In some embodiments, a first computer on the secure network sends an instruction to the first application over the first unidirectional communications channel.

In some embodiments, a method for conducting computer network operations includes deploying a first software on a first virtual machine running on a network device, and deploying a second software on a second virtual machine running on the network device, wherein the first software and second software are components of a single computer application. The method also includes executing the second software by transmitting a message over a first unidirectional communications channel from the first software, wherein the message comprises an instruction to monitor network traffic from a computer, receiving the network traffic by the second software, and transmitting the network traffic over a second unidirectional communications channel to the first software.

DETAILED DESCRIPTION OF THE INVENTION

Figure 1:
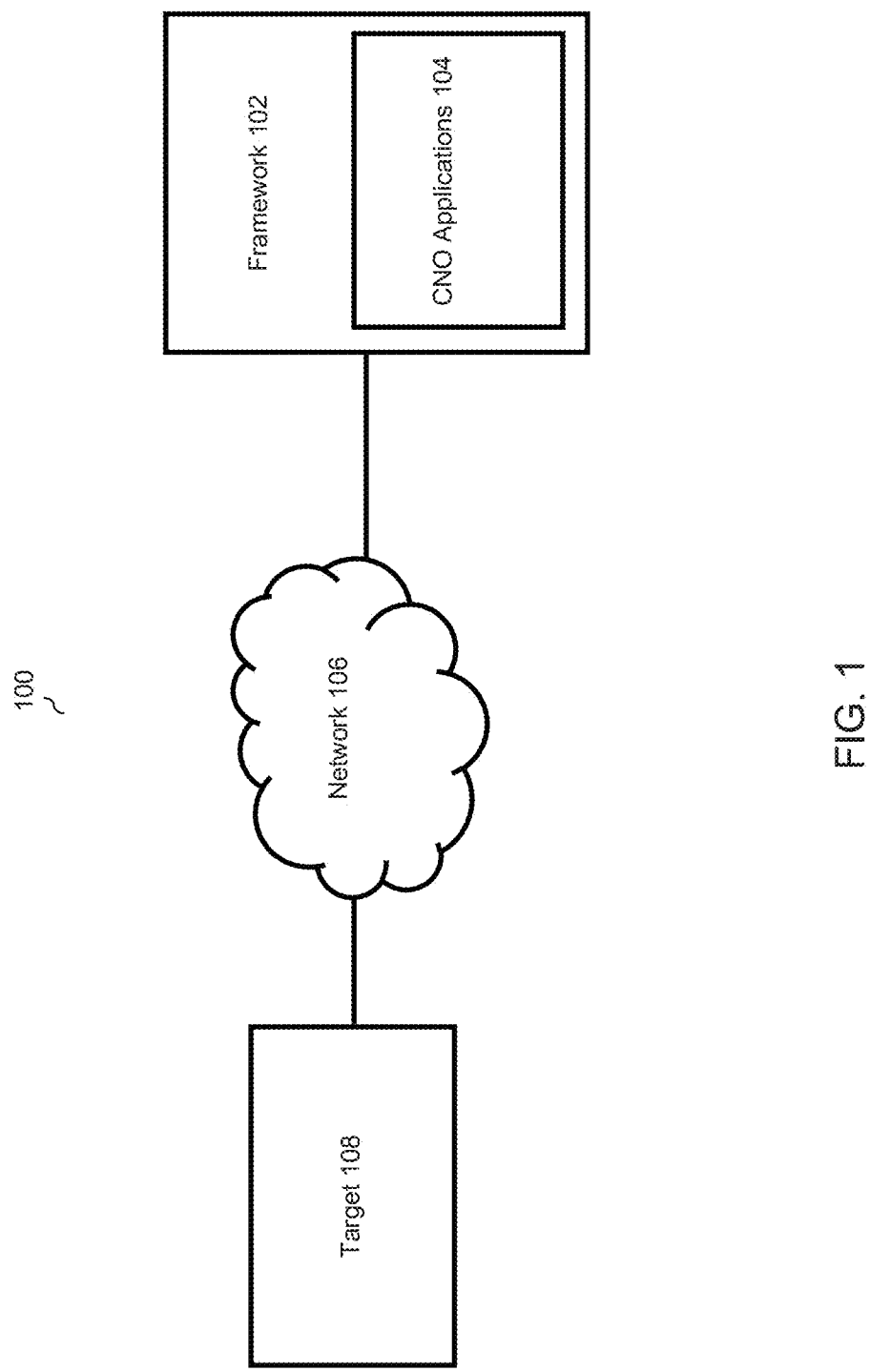
FIG. 1 is a diagram showing a network environment that includes the framework, according to some embodiments of the invention.

Described herein are systems and methods for integrating and managing a computer network operations (CNO) infrastructure. The systems and methods can maintain, manage and monitor a variety of CNO capabilities without compromising security. The system is centralized and generates virtual containers for provisioning capabilities utilized in mission operations.

The disclosed systems and methods include a framework and CNO applications. The framework may include software modules residing on hardware components. The framework is a platform that provides generic functionality for CNO capabilities. The framework may include support programs, compilers, code libraries, tool sets, and application programming interfaces (APIs) that harmonize different CNO capabilities to enable successful mission operations. The framework abstracts processes for managing a CNO infrastructure to maximize flexibility for users of the framework and for CNO application developers. CNO applications are software programs that conduct one or more processes of a mission operation such as finding a target computer system, breaching the target, extracting data or analyzing the extracted data.

The framework harmonizes several different features of disparate capabilities. First, for example, the framework includes a common database schema. The database is managed by the framework and stores outputs from disparate CNO applications. Second, a user interface harmonizes the outputs to render visualizations across two or more disparate capabilities. Third, the framework provides a common logging and auditing mechanism that administrators can use to monitor capabilities. Fourth, the framework provides virtual machine management. That is, a single VM platform is used for maintenance, management and monitoring. That allows the framework to receive, for example, heartbeats from each capability rather than just the status of the VM that contains one or more capabilities. Fifth, the framework provides standardized communications (messaging system) across a secure domain that mitigates vulnerabilities to counter attacks.

The disclosed framework unifies the use and management of CNO capabilities to provide a comprehensive infrastructure that mitigates lost opportunities to collect and analyze target data. For a CNO organization, performing offensive computer operations (OCO) encompasses complex processes that are unique to specific missions. For example, a CNO organization performs a series of processes to access a target. First, data that facilitates incursion of the target may be acquired. The data used to penetrate the target may be obtained by scanning and enumerating information available about the target. Next, the target is accessed to extract data of interest. Then the extraction is expanded throughout the target. Finally, access to the target may be sustained. Each step may require a unique capability and produces data in unique formats.

Performing OCO typically results in an overabundance of data that is difficult to manage and analyze. For example, performing a focused OCO on a single target may produce an abundance of data because a CNO organization is thoroughly engaged with the target and knows where data is stored in the targeted system. On the other hand, deploying broad and sweeping OCO operations against different targets or deploying multiple operations on the same target may also result in an overabundance of data. The latter is a more common occurrence because a mission space and scope of operations for a typical CNO organization far surpasses that of a single focused operation on a single target. Consequently, a CNO organization requires multiple capabilities and a sizeable infrastructure to accomplish numerous and diverse mission goals.

The disclosed framework may operate in virtual environments. CNO organizations may procure hardware infrastructure and then acquire suitable computer network exploitation (CNE) capabilities to meet the demands of mission operations. Capabilities may include CNO applications, exploits, implants, attack services, and the like. Although one or more CNO capabilities may be installed on a single physical device, utilizing more capabilities requires more hardware, power, physical space and cooling equipment. Virtual environments allow CNO organizations to deploy numerous capabilities for numerous complex mission operations. Utilizing a virtual environment mitigates hardware constrains to support a pool of application resources. Consequently, CNO infrastructures may include several hardware racks that support a virtualization stack for a virtual infrastructure. Capabilities are loaded onto virtual machines (VMs) and deployed on a VM platform such as VMWARE ESX or the XEN platform.

CNO capabilities are diverse, disparate and available from different sources. Capabilities include tools such as OCO applications. Generally, tools are software features that execute particular actions. Capabilities encompass the actions taken by tools as well as other features of the CNO infrastructure. CNO organizations can develop OCO tools internally or acquire them from commercial vendors or supporting government entities. Each tool may be built according to a developer's own standards. Consequently, capabilities may run on different platforms, including operating systems, hardware architecture, and dependencies such as runtime, DLLs, installed programs and interpreters. Moreover, a capability typically produces data in a format that is unique to that capability. Unfortunately, CNO administrators are burdened by having to become experts for each unique capability to install, maintain, manage and monitor a library of capabilities. Conventional systems rely on "glue-ware" to integrate multiple capabilities together. Glue-ware is written and customized by an organization to enable transformation of data to a common format to aggregate the data for analysis. Thus, glue-ware must be rewritten every time any capability has been updated.

The disclosed framework relieves CNO administrators from performing routine processes that are unique to specific capabilities. For example, in conventional systems, administrators install each capability on hardware that meets specific power, space and cooling requirements, or on virtual platforms such as VMWARE ESX or XEN. Either way, administrators must ensure that platform requirements are met in order for the capability to run properly. Each and every capability loaded to a CNO infrastructure is typically analyzed in a same comprehensive way.

Capabilities also typically provide unique portals for user access that may include a GUI, CLI or web interface. This burdens users to learn to navigate through information to find desired data and input forms. Moreover, different interfaces may use unique terms and layouts to present data and forms, which increases time required to train users on a full range of tools. Unfortunately, expert knowledge acquired by administrators for each capability is lost by a CNO organization when administrators leave the organization. Moreover, constrains on time and costs required for training new personnel results in misconfigurations and lost mission opportunities.

Existing frameworks combine similar capabilities but do not facilitate the provision, deployment, management and tasking of diverse capabilities within the context of an instance in a virtual environment. Existing frameworks are not designed to work with cross domain solutions and do not support integration of legacy applications.

The disclosed framework solves the aforementioned problems with a single unified interface that is used across a library of capabilities. Administrators are not required to learn new interfaces in addition to becoming proficient with existing interfaces. CNO organizations are thus relieved from slowdowns required for administrators to become proficient with new tools. The disclosed framework mitigates the occurrences of misconfigurations because administrators only have to be proficient with a single interface to manage multiple capabilities.

The disclosed framework provides command and control for a group of capabilities across a CNO infrastructure. Capabilities interact with target computer systems and generate records of data associated with interactions. In conventional systems, each capability stores this data in structures defined by the developer. For example, each capability may store data in different formats and in a defined directory that is only local to each capability. Formats may include XML, JSON, CSV and DB. The disclosed system harmonizes these structures with a common data store for the framework, not for each specific capability. Data is stored in a secure location and aggregated from different capabilities for a comprehensive analysis and display.

The disclosed framework enhances security to collect data from target computer systems by mitigating vulnerabilities to counter-attacks during maintenance, managing and monitoring of capabilities. The framework facilitates ensuring that data is ported to a secure network. Collected data is transformed into a common format, and may be correlated and parsed prior to storing the data to memory.

CNO organizations can maintain an infrastructure as complex as those described above without requiring a larger footprint due to accumulated capabilities for growing mission operations. CNO organizations are able to grow while still maintaining the network. The necessity to hire more administrators is mitigated and concerns over personnel turnover are minimized. Administrators are not burdened to learn about a greater number of tools that would otherwise extend their job roles beyond IT administration.

The disclosed framework can handle changes in CNO infrastructures. Capabilities can be changed with enhancements and upgrades without rewriting or modifying any glue-ware. The framework user interface can also be updated or changed without requiring administrators to learn how to use the changed interface. Dependencies and installations can be changed without requiring administrators to maintain multiple versions of the same capability. Moreover, administrators are no longer required to cycle through maintenance, management and monitoring steps for each tool. Thus, the system eliminates the complexity and disruptions that lead to misconfigurations of capabilities in conventional systems. Moreover, CNO organizations maintain their ability to effectively observe counter-attack efforts against an exposed portion of an infrastructure, which ultimately mitigates loss of agility during mission operations.

A. System

Components of network environment 100 are shown in FIG. 1. Network environment 100 includes framework 102 and CNO applications 104, which may reside on the same or different servers, may be distributed across multiple servers, or combinations thereof. Framework 102 communicates with target computer system 108 over network 106. For the sake of brevity, FIG. 1 only shows a single target 108. However, system 100 may include two or more targets, which may include the same or different hardware and software components. From the perspective of framework 102, a target may correspond to an IP address, URL, data string that represents a person, or the like. Each capability, such as CNO applications 104 may use a variety of ways to define a target. However, framework 102 includes a common database that allows each CNO application to store data to a common target data structure.

Framework 102 and target 108 may communicate over network 106, such as the Internet. Other communications technologies may include, but are not limited to, any combination of wired or wireless digital or analog communications channels. These communications technologies can include Ethernet, Wi-Fi, BLUETOOTH, and other wireless radio technologies. Network 106 can include, for example, the Internet, a local area network (LAN), a wide area network (WAN), a cellular phone network, or the like, and combinations thereof.

Framework 102 and target 108 can include a server, device, wired or wireless machine, or combinations thereof, for sending and receiving data. For example, framework 102 may include an appliance, and target 108 may be any portable device, such as a smartphone or laptop computer. In some embodiments, these devices may be configured to send and receive voice or data through the Internet, a cellular network, web browser, dedicated applications, or the like.

Framework 102 and target 108 can be or can include computers running any version of LINUX, UNIX, MICROSOFT WINDOWS, MAC iOS, ANDROID, or another operating system or platform. Framework 102 and target 108, and components residing therein, may include a communications interface. A communication interface may allow direct connections, or over network 106, to other devices, servers, or the like. In some embodiments, target 108 can be connected to another target server or device via a wireless interface. Under control of an OS, application programs that run on framework 102 or target 108 exchange commands and data with external sources, via a network connection or USB connection to transmit and receive information during execution of framework 102 or target 108.

As shown in FIG. 1, framework 102 may facilitate conducting CNO operations directed at target 108. In some embodiments, framework 102 includes a library of CNO applications 104 that are used to find, breach, collect and analyze data from target 108 on a regular or periodic basis. In some embodiments, components of framework 102 or target 108 may be distributed across several servers, mobile devices, or combinations thereof. These devices may each include an input interface, processor, memory, communications interface, output interface, or combinations thereof, interconnected by a bus. The memory in these components may include volatile and non-volatile storage. For example, memory storage may include solid-state drives (SSD), read only memory (ROM) in hard disk devices (HDD), random access memory (RAM), and the like. The OS and application programs of these devices may be stored on SSD.

As shown in FIG. 1, information about target 108 is collected over communications network 106, through another networked facility, or from a dedicated input source, or combinations thereof. The devices housing framework 102 or target 108 may be connected to input devices, such as a keyboard or mouse. A display, such as a conventional color monitor, and printer, such as a conventional laser printer, may also be connected to output interfaces. The output interfaces provide requisite circuitry to electrically connect and interface the display and printer to the devices housing framework 102 or target 108. Through these input and output devices, a user can access and install applications on framework 102 or target 108.

Portions of environment 100 may be embodied on a distributed processing system to break processing apart into smaller jobs that are executed by different processors in parallel. The results of the parallel processing could be assembled once completed. In some embodiments, features of framework 102 can be provided to environment 100 as a subscribed service.

Program modules that implement framework 102 may be incorporated in a network appliance. The program modules may execute under control of an OS, as detailed above. When embodied as an appliance, framework 102 and CNO applications 104 can operate in a manner that is substantially, or totally, transparent to users. In some embodiments, framework 102 and CNO applications 104 could be embodied as tools that run on any JAVA enabled platform.

In some embodiments, framework 102 is implemented in JAVA to make use of SPRING FRAMEWORK. This framework facilitates modular design from the code up allowing for aspects of framework 102 to rapidly adjust to support legacy applications. An example is the communications between framework 102 components and CNO applications 104. In some embodiments, implementations use an AMPQ message broker to handle communications between software infrastructure components and applications. This implementation can be rapidly pulled out to facilitate RESTful communications or future communication implementations.

Framework 102 or target 108 can execute on servers that provide websites for administrators to access these servers over network 106. Anyone with proper access rights to framework 102 can connect to, and use, visualization tools provided thereby. These components can run on any type of server, including virtual servers or actual machines, and can be designed to operate in any computing environment because they have few requirements for underlying hardware and operating systems.

B. Framework

Framework 102 facilitates development, deployment, and integration of capabilities in computer network operations (CNO). Framework 102 provides auditing, control, monitoring, provisioning of capabilities, enhanced security of infrastructure assets, task services tracking, and manages dataflow between secure and unsecured networks. In other words, framework 102 simplifies and securely streamlines using diverse capabilities in mission operations. CNO organizations can thus focus on completing mission operations rather than being burdened with costly integration and infrastructure issues.

Framework 102 may be a software layer that is deployed on a virtual layer. Framework 102 may contain a set of virtual machine environments that contain CNO capabilities such as CNO applications 104. CNO applications 104 can provide specific offensive computer operations (OCO) processes such as finding a target, breaching the target, collecting data from the target, and analyzing the collected data. Virtual environments may contain virtual system components (VSC) such as operating systems, VMWARE tools, virtual resources and hardware that are managed in much the same way as a physical computer. For example, VSC can manage deploying, tasking and data flow of CNO applications 104.

Figure 2:
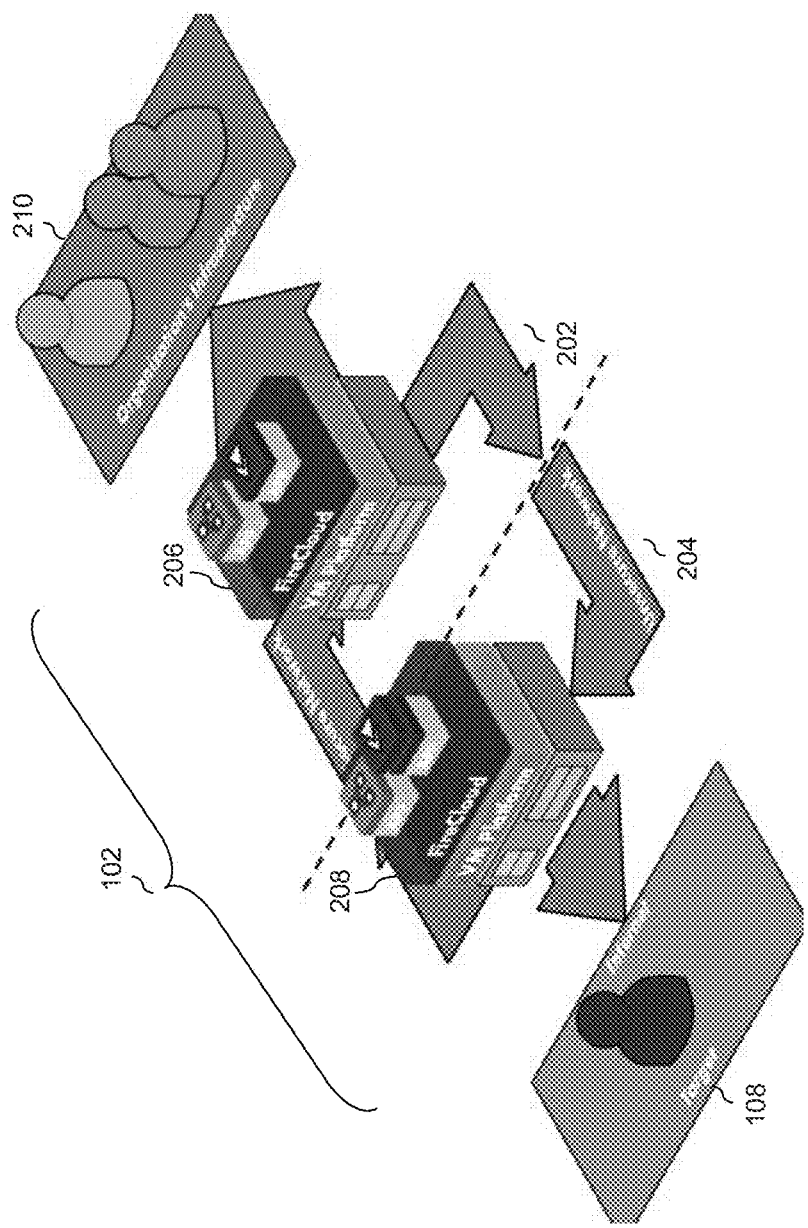
FIG. 2 is a diagram showing components of the disclosed framework, according to some embodiments of the invention.

FIG. 2 shows framework 102 as a network appliance that connects secure network 202 and unsecured network 204. CNO infrastructure 210 resides on secure network 202 and target 108 resides on unsecured network 204. Framework 102 can deploy capabilities across a security domain, from secure network 202 to unsecured network 204. Framework 102 creates an asynchronous security boundary between these networks. That is, framework 102 creates a unidirectional network that allows data to travel only in one direction to guarantee security of CNO infrastructure 210. Framework 102 only allows data to pass asynchronously between low side 208 on unsecured network 204 to high side 206 on secure network 202. In some embodiments, diodes are used to form the unidirectional network that protects CNO infrastructure 210 from exposure to target 108. In some embodiments, unidirectional gateways, routers or the like can be used to provide the unidirectional network. In some embodiments, two diodes form unidirectional communications in opposite directions between low side 208 and high side 206. CNO applications 104 can communicate in at least two different ways. First, they use standard network services to access datasets and for logging data. Second, they can message other applications, including the ability to forward information across the diodes.

Low side 208 includes CNO applications that are exposed to target 108 to conduct offensive operations. The data collected by CNO applications on low side 208 can then pass through a first diode to high side 206. In some embodiments collected data can be written to memory at low side 208 and sent periodically as batches to high side 206. High side 206 also includes CNO applications that are exposed to CNO infrastructure 210. Data transmitted by CNO applications on high side 206 can pass through a second diode to low side 206. Users at CNO infrastructure 210 have access to data from low side 208 while data at CNO infrastructure 210 remains secure. In some embodiments, a system may include multiple low sides and fewer high sides, where each low side can be installed in a different geographic region.

In some embodiments, unidirectional communications channels between high side 206 and low side 208 are formed with a data proxy component and a data receiver component on either sides of each diode. For example, a proxy at low side 208 could be a virtual machine that forwards data to a receiver at high side 206 that could be another virtual machine. The proxies and receivers are diode agnostic, and the messages get routed through each diode. The combination of proxy and receiver for each diode work to send traffic asynchronously between the high/low boundary. That is, traffic is routed, forwarded or redirected by one of the proxies to the other side's receiver. In some embodiments, CNO applications can designate which proxy will send data and when the data will be sent. Accordingly, traffic only passes in one direction, either from low to high or high to low, but not bidirectionally. This configuration prevents any direct connection between secure network 202 and unsecured network 204. Consequently, conventional hacking techniques are prevented because there is no return path from target 108, because data is gated by the diodes. This configuration mitigates any vulnerability of intrusions from target 108. In some embodiments, data passing from high to low can be encrypted. Data stored at the low side can also be encrypted so that only the high side can decrypt data from the low side. Use of encryption mechanisms ensure that target 108 cannot obtain information from framework 102 that can be used for a counter attack.

Framework 102 permits bidirectional communications between high side 206 and CNO infrastructure 210, and permits bidirectional communications between low side 208 and target 108. For example, high side 206 can send and receive data synchronously with CNO infrastructure 210. Data sent to CNO infrastructure 210 may include data obtained from target 108 through low side 208. High side 206 can send data asynchronously to capabilities on low side 208. In some embodiments, framework 102 responds to communications from CNO infrastructure 210 about CNO applications that are communicating with target 108. The data may include instructions to manage, control or run a CNO application, or include application data itself. Framework 102 may respond, for example, by running CNO applications 104 to monitor high side 208 for network traffic from target 108. Although low side 208 may be subject to counter-attacks from adversaries like target 108, the high/low configuration of framework 102 protects secure network 202 from intrusion.

Data such as heartbeats, logs, and task results that are generated on unsecured network 204 are passed to secure network 202 where they are processed and made available for analytics tools of CNO infrastructure 210. For example, CNO applications on low side 208 may send a heartbeat signal to secure side 206. Framework 102 provides heartbeat functionality as a standard API for CNO applications. In some embodiments, heartbeats are periodic messages that contain timestamp information, an indicator of the capability, a description of the content and the content itself. In some embodiments, transaction logs are created to track asynchronous communications to provide an auditable record of the data flow.

Figure 3:
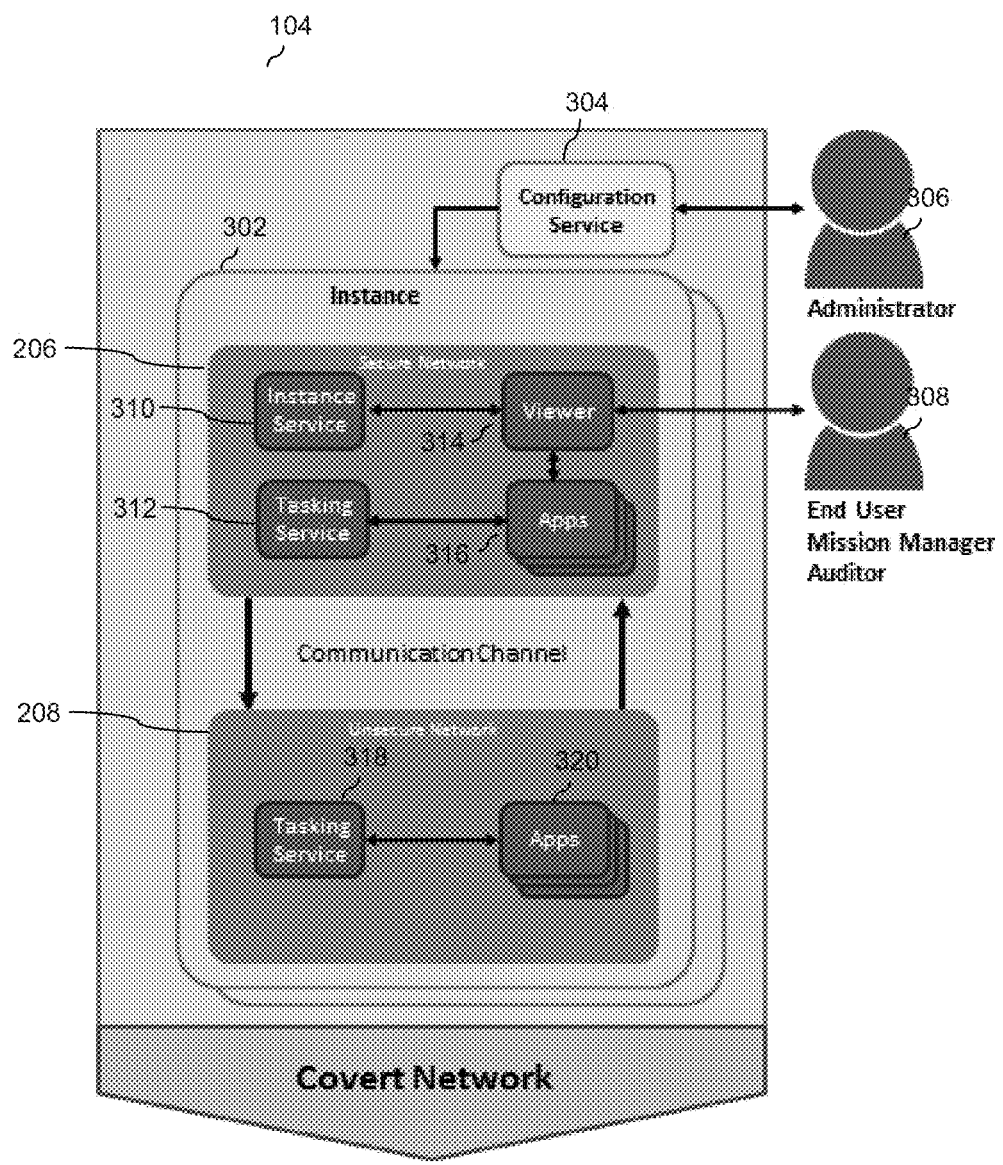
FIG. 3 is a diagram showing a virtual instance of the disclosed framework and components therein, according to some embodiments of the invention.

FIG. 3 shows a virtual instance 302 of framework 102 and components therein. Framework 102 may contain one or more instances 302. Instance 302 forms a logical connection between high side 206 and low side 208. Each instance 302 can be tailored for specific CNO organizations or mission operations by logically grouping virtual system components (VSC) and specific capabilities. Instance 302 may include a collection of virtual machines. Each virtual machine includes a tool, such as a CNO application. In some embodiments, some virtual machines of instance 302 are management applications for framework 102, such as instance service or manager 310. An instance may be deployed for each mission and/or scaled with more tools.

For example, two instances may each correspond to different mission operations that require different CNO applications for different target computer systems. Each instance 302 establishes communications channels between low side 208 and high side 206. Framework 102 can readily scale instances to meet operational demands and to add more instances for mission diversity. Instance 302 manages capabilities across a network boundary between low side 208 and high side 206. For example, instance 302 provides CNO applications and interfaces to pass data between unsecured network 204 and unsecured network 202, while checking to ensure validity and reliability of the data.

Instance 302 may include an instance service, tasking service, viewer, CNO applications, and the like, residing on high side 206 and/or low side 208. Instance service 310, tasking service 312, and viewer 314 are agents of framework 102 that reside on high side 206. These components may be common to multiple instances and are used to manage and control each instance. In some embodiments, CNO applications include a low side component 320 and a high side component 316. Each component may correspond to its own virtual machine. Low side component 320 executes actions that are directed at monitoring traffic from target 108, and feeds obtained data to high side component 316. High side component 316 also provides management logic. High side component 316 obtains data from corresponding low side component 320 and renders the obtained data at infrastructure 210 through viewer 314. Tasking services 312 and 318 communicate with high/low side components 316 and 320, respectively, to task actions for CNO applications. Instance 302 establishes communication channels between low side 208 and high side 206 to communicate data between the capabilities.

Figure 4:
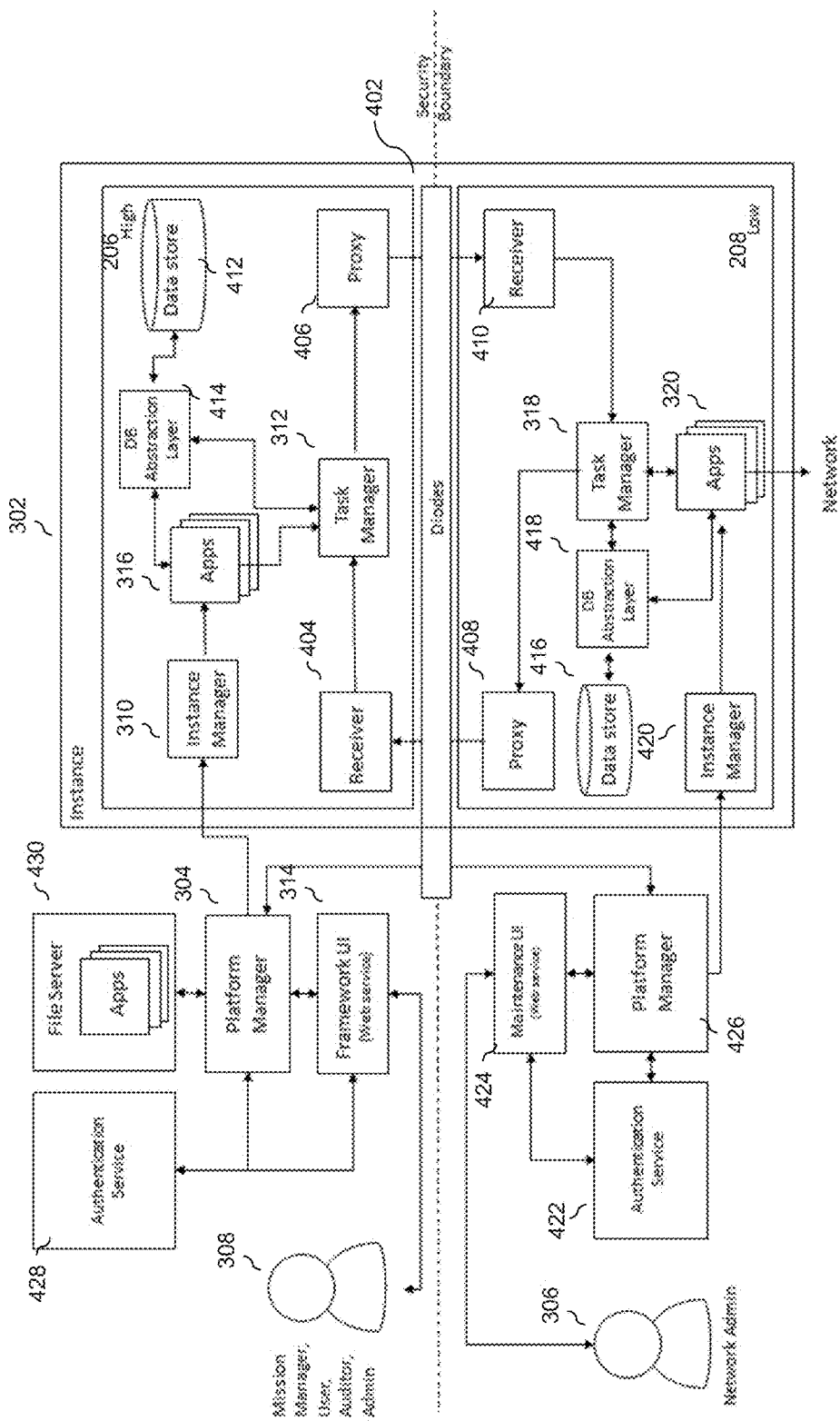
FIG. 4 is a diagram showing communications between different components of the disclosed framework and other components on secure and unsecure networks, according to some embodiments of the invention.

FIG. 4 expands on FIGS. 2 and 3 by showing communications between different components of framework 102, and other components on secure network 202 and unsecure network 204. For example, diodes 402 at a security boundary provide the unidirectional communications between high side 206 and low side 208. In some embodiments, low side 208 includes instance service or manager 420, data store 416 and database abstraction layer 418. Low side 208 may also include receiver 410 to communicate with proxy 406 in a unidirectional manner, as detailed above. High side 206 may include receiver 404 to communicate with proxy 408 in a unidirectional manner that is opposite in direction to the communications between receiver 410 and proxy 406.

In some embodiments, network administrator 306 may be required to setup the platform manager portion 426 in unsecure network 204. Once this is complete, and the platform manager low 426 and high 304 can communicate through diodes 402, all instances and applications can be launched from secure network 202. Any mission manager, end user and normal administration operations may then occur through secure platform manager 304. In some embodiments, maintenance UI 424 may not be for normal user usage, and may just be for use by network administrator 306.

In some embodiments, high side 206 similarly includes instant service or manager 420, data store 416 and database abstraction layer 414. A CNO organization on secure network 202 includes file server 430 that provides a library of CNO applications, and includes authentication server 428 to implement user roles. Unsecure network 204 may include an authentication service 422 and maintenance user interface 424, which may be part of configuration service 304. Unsecure network 204 may also include a configuration service or platform manager 426 that communicates with configuration service or platform manager 304 on secure network 202, over diodes 402.

In some embodiments, the data obtained from each capability is stored in a common database. A database abstraction layer is included in each instance for CNO applications to store data. Data may be formatted in a common format and retrieved on-demand from each instance to be post processed. Use of a common database facilitates harmonizing multiple CNO applications. Notably, CNO applications use different inputs and provide different outputs, use different protocols and different syntax. Framework 102 treats capabilities, such as CNO applications, the same way by normalizing interactions with capabilities.

Framework 102 can be installed on existing virtual machine environments of CNO infrastructure 210. Administrator 306 can use configuration service 304 to install framework 102 on secure network 202 and unsecured network 204. Configuration service 304 behaves like a separate instance that sets up and manages other instances. Administrator 306 can configure high side 206 and low side 208 to communicate through unidirectional communications channels. Administrator 306 can then deploy one or more instances for use by end users, mission managers and auditors 308. Deployed instances 302 are initialized with some or all components that drive overall functionality of framework 102. In some embodiments, administrator 306 can configure an authentication mechanism to limit access to instance 302 by specific users.

In some embodiments, framework 102 is employed on a virtualization layer. Framework 102 could be used with a cross-domain solution for operational purposes. In an exercise environment, guards can be exchanged for a routing solution, such as a virtualized router. In some embodiments, framework 102 is software based and can be deployed on a variety of hardware configurations. This means that framework 102 could be deployed on small form factor devices. To support geographical dispersed operations, low components of an instance can be deployed on hardware that satisfies physical power, space, and cooling requirements aboard a physical platform and provides sufficient computing power to support application needs.

Capabilities, such as CNO applications, are initially stored on a file server at CNO infrastructure 210 before they are deployed to framework 102. In some embodiments, CNO applications are stored in a library, which may be encrypted. High/low components for a CNO application are deployed together as an instance. Low side component 320 is deployed across the security boundary to low side 208 and deploys into instance 302.

Mission manager can configure and deploys CNO applications to instance 302 that are required for specific mission operations. An interface connected to configuration service 304 can be used to select CNO applications from the library and new applications that can be deployed as needed. Mission managers can save a specific configuration of instance 302 as a template to provide a one-click deployment of instance 302 for future mission needs, as detailed below.

End users can task deployed CNO applications through viewer 314. When a task is issued for a particular CNO application, framework 102 adds metadata to the task to ensure that it is handled appropriately on unsecured network 204. Framework 102 then passes data to CNO infrastructure 210 through the secure/unsecured transfer solution detailed above. Upon receiving the data at low side 208, framework 102 validates the data and forwards the task to the appropriate CNO application.

As shown in FIG. 3, CNO applications perform tasking, and data generated by low side component 320 is passed on to high side 206 through the unidirectional security gateway formed by framework 104. Data from the unsecured network 204 is validated and submitted to a data store associated with instance 302. The data can be rendered on viewer 314 after applying analytical tools or can be further processed.

Throughout the operational life cycle of a mission, framework 102 may track all actions and tasking within an instance. This facilitates oversight of all aspects of an organization's CNO mission. In some embodiments, each end user task is logged along with all system transactions. Auditors 302 can view the system logs, which may include highlighted rules that have been violated by end users.

In some embodiments, an instance includes virtual machine environments that are different for high side 206 and low side 208. In some embodiments, as detailed above, virtual machine environments are instances provided by the same virtual machine kernel. In some embodiments, the one or more virtual machine environments include one or more memories for storing data output from CNO applications 104. The virtual machine environment of high side 208 may obtain data from the virtual machine environment of low side 208 and store the data.

In some embodiments, framework 102 is VM platform agnostic to support any VM platform. In other words, the majority of framework 102 components are decoupled from any specific VM platform implementation. This configuration allows framework 102 to be readily ported to a variety of enterprise virtualization solutions such as ESX, XEN, KVM, HYPER-V, VCENTER services, an implantation of XEN via OPENSTACK and AWS-STYLE services.

In some embodiments, framework 102 may be embodied as software program modules stored on non-transitory computer readable mediums. Framework 102 may include CNO applications 104 and related services. The program modules can be executed by CPUs on one or more servers. Program modules are extensible and can be combined to build larger product packages such as standard or enterprise solutions. For example, a baseline software package may include framework 102 rendered on optical media and installable onto a server of a CNO infrastructure. The software may include manuals for particular user roles, including administrator, mission manager, auditor, and end user. The program modules may also include a software development kit (SDK) for framework 102 and manuals with tutorials to help developers.

In some embodiments, framework 102 is included in an appliance. The appliance is connected to a CNO infrastructure and may include a manager to configure high/low sides of framework 102. The appliance may also include manuals for different user roles, an SDK and corresponding manuals for developers.

In some embodiments, framework 102 may include training modules to train operational users and developers. These training modules are designed to help CNO organizations implement framework 102 and their specific operational missions. In some embodiments, a service support package for framework 102 allows users to receive remote service support that may include software fixes or patches and administrator support for framework 102. In some embodiments, framework 102 includes legacy application integration. In some embodiments, custom CNO applications can be developed for specific mission needs and/or various CNO applications bundled in a package.

Framework 102 provides a layer of abstraction to facilitate operating a complex CNO infrastructure. The flexibility of framework 102 saves a CNO organization time and money by providing a common standard for capability development and corresponding use in mission operations. Framework 102 may be integrated into a CNO organization's existing VM infrastructure and legacy applications.

Thus, framework 102 provides a common operating picture for a cyber commander. This is due to the benefits of a common data store and logging mechanisms within the framework and available to application developers. Framework 102 provides logical separation of CNO assets between instances. This allows the organizations to segregate operational tools and mission space. Further, framework 102 provides a common interface for tasking diverse CNO assets, and minimizing training and human error.

C. Use Cases

Framework 102 can perform most or all processes required to solve several types of use cases for CNO organizations. For example, framework 102 can handle complex technical tasks for users and administrators to reduce training times, maximize developer input and use, and report responses to common and complex queries about capabilities of framework 102.

Framework 102 can benefit developers because it performs functions in a unified manner across different capabilities. Thus, updating multiple capabilities becomes simple and intuitive when performed by framework 102. Framework 102 may provide feedback to guide user experience for use cases. Framework 102 may also include a software development kit (SDK) that allows CNO organizations and developers to build custom solutions. For example, one or more APIs may be used to create a custom capability. Framework 102 provides solutions to the following use cases, which are non-limiting examples that are meant to be representative of a broad range of use cases for framework 102.

1. Provisioning

Framework 102 facilitates partitioning disparate capabilities for mission operations. Unlike conventional systems, framework 102 does not require performing numerous steps to provision a capability. Conventional steps include building a virtual machine (VM) for a capability, installing dependencies, configuring a VM for a network, installing or patching the capability, configuring the capability, testing the capability, and moving the capability to the unsecured network 204. Conventional systems require performing each of these steps for each capability, which requires knowing low-level details for deploying each capability. Thus, conventional provisioning is prone to configuration errors, which may lead to security risks.

Framework 102 simplifies the process of provisioning. A single user interface, such as a web interface, can be used to configure and deploy instances that contain capabilities, as detailed above and shown in FIG. 3. The user interface is centralized and unified to simplify the process of configuring and deploying multiple CNO applications. For example, configuration of an instance may be accomplished through a web interface that guides a user through the process. In some embodiments, gesture technology is utilized to perform CNO in real time. In some embodiments, a CNO and target network can be visualized via a 3D representation that enables seeing endpoints geographically as well as logically.

The process is further abstracted by enabling automatic configurations of instances based on a template. A template includes a preset configuration of an instance that eliminates the need to recreate the same configuration for each instance. Framework 102 may use templates that allow administrators to make a reference copy of a configuration. For example, a CNO organization can create a reference template that can be shared with a group of users of framework 102. The template may include all deployed applications, network configurations, and application configurations. A reference template can quickly and easily create other instances according to configurations designated by the template. A user can then simply load the template, and framework 102 will automatically configure an instance accordingly.

Figure 5:
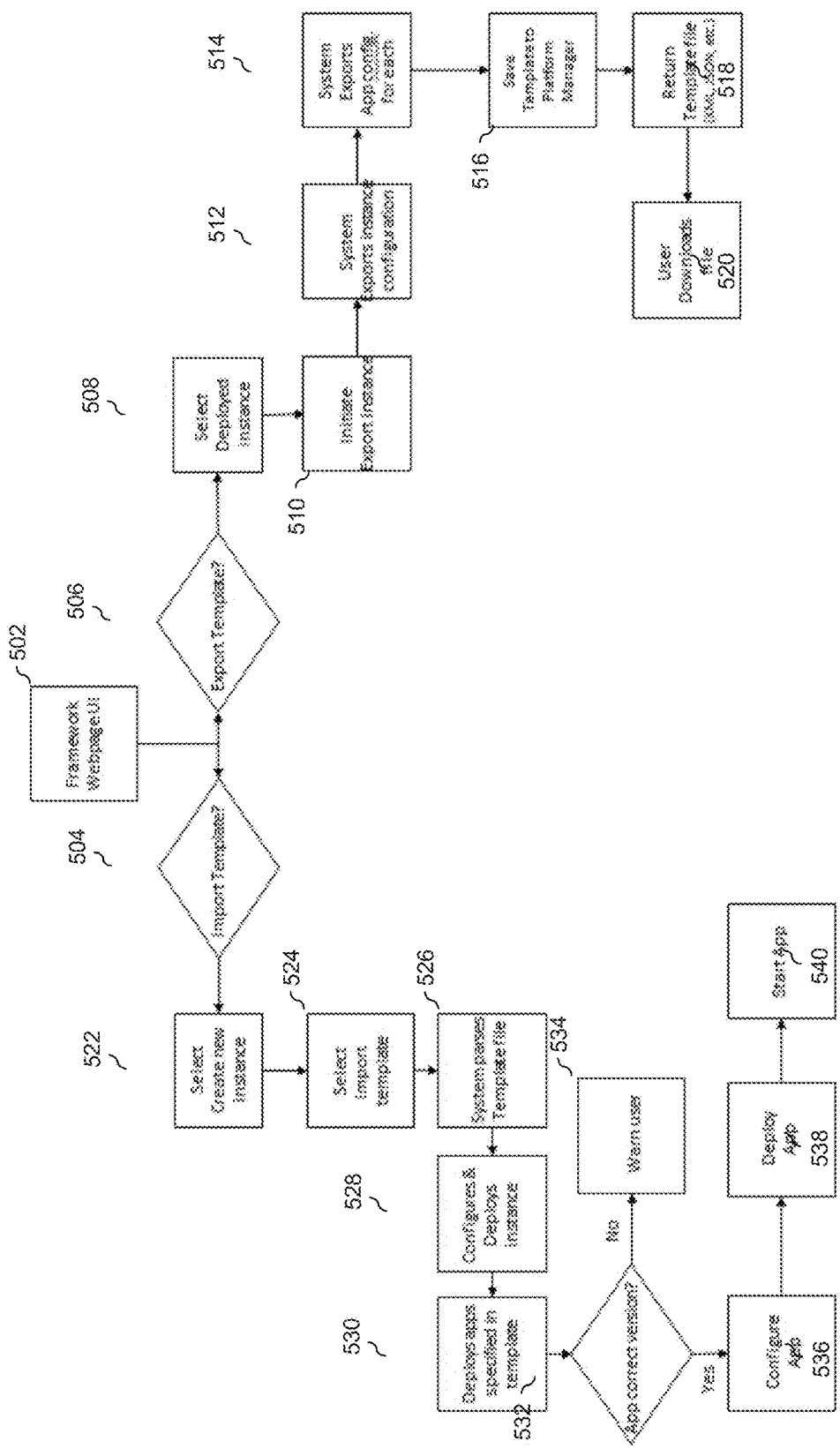
FIG. 5 is a flowchart showing steps for importing and exporting templates used for configuring instances, according to some embodiments of the invention.

FIG. 5 is a flowchart showing examples of steps for importing and exporting templates used for configuring instances that include applications. In step 502, a user interface of framework 102 is used to access modules for importing or exporting templates. In some embodiments, the user interface is a webpage that is accessible through viewer 314. A user can choose to export a template file according to step 506. The template file includes, for example, configuration information from a deployed instance selected by a user, according to step 508. Then the selected instance is initiated for export, according to step 510. In step 512, configuration information for the selected instance is exported by framework 102 as a template file. The exported template file may include configuration information for each application contained in the selected instance, according to step 514. In step 516, the exported template file is saved by configuration service or platform manager 304. In step 518, the saved template file is returned, to a requesting user, in a common format such as XML, JSON, or the like. In step 520, a user can download the template file and use it to configure a different instance.

A user can choose to import a template, according to step 504. When choosing to import a template, a user initially selects to create a new instance, according to step 522. Then a template file is selected for importing to the new instance, according to step 524. In step 526, the imported template file is parsed to extract configuration data. In step 528, framework 102 configures and deploys the new instance according to the imported template file. In step 530, the applications deployed in the new instance are configured according to the imported template file. In step 532, framework 102 confirms that the applications specified by the template file are the correct or most recent versions. A user may then be alerted if an application is not correct or the most recent, according to step 534. In step 536, the applications of the new instance are configured according to the template file if all the applications are correct or the most recent versions. In some embodiments, an instance and the applications it contains can be configured according to the template file regardless of whether the applications are current or the most recent. In step 538, the configured applications can be deployed.

Finally, in step 540, deployed applications that are configured according to the imported template file can be started by a user. In some embodiments, the steps for importing or exporting templates are manual, automatic, or combinations thereof.

Framework 102 can provision any capability, including automated attack services, listing posts, intelligence reconnaissance surveillance (ISR) services, or interactive stations. Framework 102 treats each of these capabilities as a CNO application that can be provisioned and deployed as such by framework 102. Framework 102 can also manage capabilities that support the entire life-cycle of computer network exploitation (CNE).

In some embodiments, framework 102 utilizes a standard data-store format. Thus, developers can build capabilities according to framework 102 specifications and use its standard data structure. The common data-store may include an API that can interact with applications, and analytical and mission support tools such that they can operate without the hassle of transforming data to a common data structure.

2. Management

Framework 102 facilitates management of disparate capabilities. Management may include updating, configuring and tasking a capability. Unlike conventional systems, framework 102 does not require performing numerous steps to manage capabilities individually. For example, conventional steps for updating a capability include taking a VM and all its services offline, moving updates and a patch to the VM, updating the capability, and then bringing the VM and all its services back online Conventional steps for configuring and tasking require moving a capability to low-side 208, then stopping, updating and restarting the capability. The capability is then tested to ensure that it operates correctly. The conventional configuration process is further burdensome because expert knowledge of different capabilities is required to perform the configuration steps. Moreover, these steps require a substantial amount of time from CNO personnel, which results in lost mission opportunities. In addition, as noted above, administrators perform these management tasks on low-side 208, which renders the system vulnerable to counter-CNE attacks.

Unlike conventional systems, framework 102 can replace an existing CNO application instantaneously because the updated CNO application can be deployed as a virtual machine at the same time that the existing CNO application virtual machine is terminated. The ability to quickly replace CNO applications is due to the use of a common database that stores data for each CNO application. Hence, the updated CNO application can instantly go online because it utilizes the same data of the existing CNO application. In other words, the existing CNO application is replaced with an updated CNO application but not itself updated. Hence, loss of mission opportunity is minimized because and updated CNO application is deployed at the same time that an existing CNO application is terminated.

Figure 6:
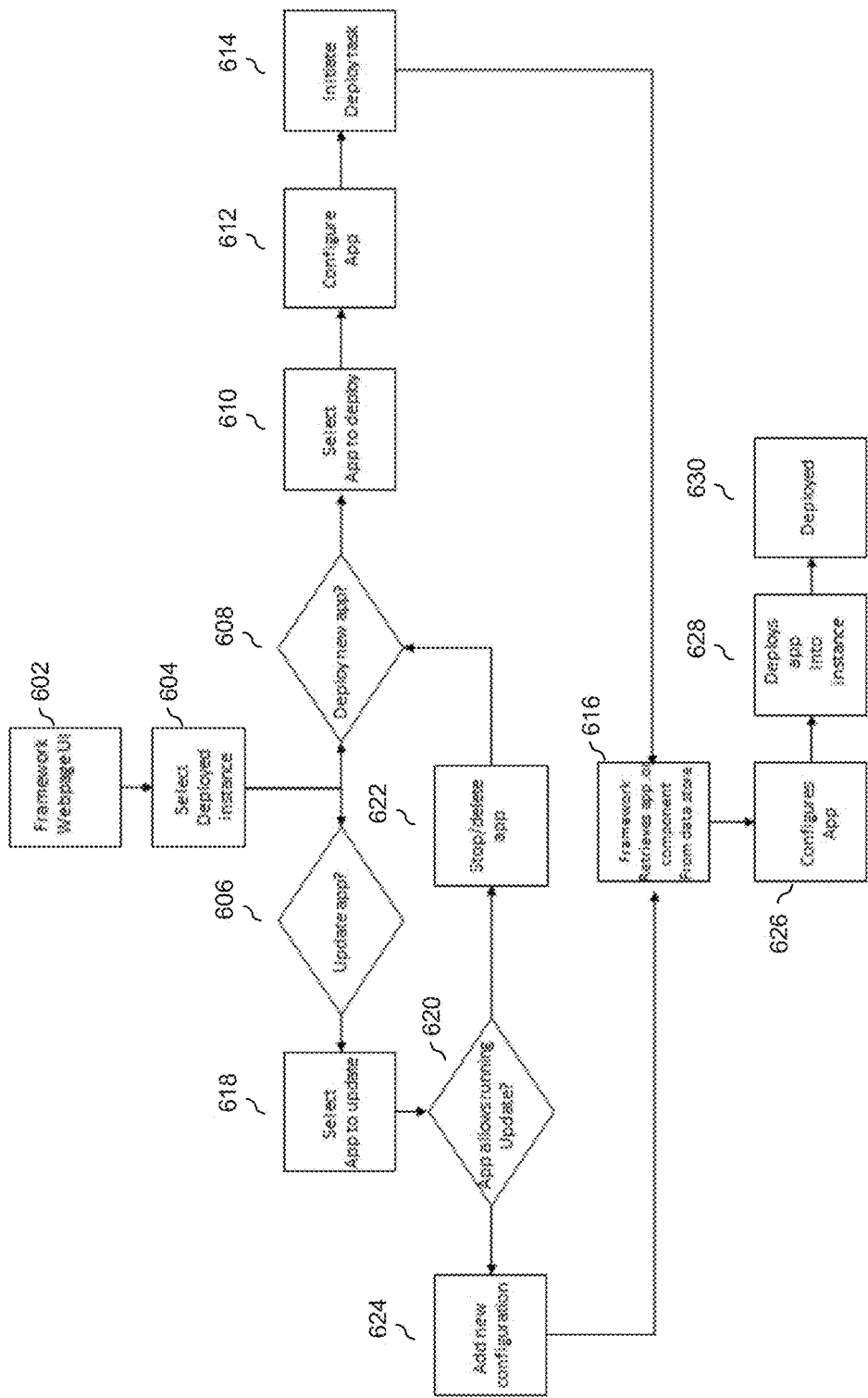
FIG. 6 is a flowchart showing steps for updating and deploying CNO applications, according to some embodiments of the invention.

FIG. 6 is a flowchart showing example steps for updating and deploying applications. In step 602, a user interface of framework 102 is used to update or deploy CNO applications. In step 604, a user may select a deployed instance that contains applications. In step 608, a user selects to deploy a new application in the instance. In step 610, the user selects which application to deploy in the instance. In step 612, the application is configured for the instance. In step 614, the user initiates a task for deploying the selected application. Framework 102 then retrieves the application or components of the application from a data store such as file server 430, according to step 616. In step 626, the selected application is configured for a mission. In step 628, the configured application is deployed into the instance. In step 630, the instance that contains the selected application is deployed.

A user selects to update an application in the instance according to step 606. In step 618, the user selects which application to update. In step 620, a determination is made about whether the selected application permits updates. In some embodiments, the update process is terminated when a determination is made that the selected application does not permit updates, according to step 622. In some embodiments, the user is prompted to deploy a new application, according to step 608, when the selected application was stopped or deleted in step 622. In step 624, updates for the selected application are identified after determining that updates are permitted. The updated application can then retrieve new configurations to be added to the application, configure the application, and deploy the updated application into the instance. In some embodiments, the steps for updating or deploying CNO applications are manual, automatic, or combinations thereof.

Thus, framework 102 simplifies management processes with streamlined workflows in which framework 102 performs otherwise redundant and complex interactions. In some embodiments, authorized users, such as administrators, can perform management processes from high-side 206, which minimizes human interaction on low-side 208 where counter-CNE activity occurs. Additionally, management processes are performed automatically by framework 102, which reduces errors and downtime. This mitigates lost mission opportunities and maximizes the effectiveness of time used for mission operations. Thus, framework 102 provides a unified way to update, configure, and task capabilities. This allows CNO application developers to build capabilities that are standardized by framework 102.

3. Logical Division of Assets

Framework 102 helps CNO organizations that support numerous missions to organize and manage their CNE assets accordingly. Organizing CNE assets is important for management of configurations, tasking, and use of different physical network topologies. An organization can create several CNE infrastructures and subordinate tactical units can control their operations.

Rapidly deploying CNE infrastructures for demanding mission operations is problematic in conventional systems because CNE infrastructure simply cannot be rapidly cloned and deployed. For example, some capabilities are stored on hardware and others are virtualized. In virtualized environments, conventional systems do not provide any mechanisms that allow administrators to configure capabilities in conjunction with cloning the VM. Consequently, creating a CNE infrastructure requires provisioning a new capability that includes performing all the aforementioned steps, configuring the capability for the mission to ensure that data flow is established, and testing the configuration. Again, conventional systems require an administrator to perform these steps for each capability, which quickly becomes time consuming. This process is especially daunting for organizations that have a massive infrastructure that supports multiple teams performing numerous missions.

Framework 102 solves the problems of conventional systems by deploying capabilities in a unified instance, which contains all system components and CNO applications required for a mission operation. An instance is configured to work with a VM platform network connection, and may contain user interfaces, programmatic interfaces, management services for applications and instances, and data-stores. Several instances may be created, and each instance can have its own configuration with specific CNO applications. Moreover, authentication can be managed to permit users access on a per instance basis, and each instance may provide an API to its data-store and tasking manager for compiling data across multiple instances.

Framework 102 keeps deployment and management of an instance simple. Instances also provide flexibility for an organization to allow users to designate capabilities. Instead of being confined to a rigid predefined structure, framework 102 can deploy instances in parallel with the organization's structure. An API for each instance allows for insight into data for each instance from an organization to pull the data for analysis across all instances, or build a centralized or decentralized command and control of its operational capabilities.

4. Awareness of CNE Exposure Surface

An exposure surface corresponds to deployment information about what capabilities are running, the status of those capabilities, their configuration, and all other data points that inform what aspects are exposed to target 108. In other words, the exposure surface is the portion of CNO infrastructure 210 that is exposed to hacking from target 108.

Framework 102 facilitates monitoring capabilities by a CNO organization. In contrast, conventional systems use VM platform utilities to monitor resource usage of a guest VM but cannot monitor CNO capabilities. This is problematic because knowing capability's state and configuration is important for offensive computer operations. Framework 102 tracks awareness constantly and may be easy to reference from all CNO applications and system components.

Unlike conventional systems, knowledge about a capability's state is not limited to an implementation of CNE infrastructure. Instead, framework 102 can meet the demands of a growing mission scope. In conventional systems, this demand is met by increasing a capability footprint, but as configuration changes occur within a capability, managing state information and configuration of the exposure surface becomes a daunting task. Failure to properly manage and understand a state and configuration of capabilities may lead to lost mission opportunities with a target or even failure to identify counter-CNE activity against the exposure surface. This may result in loss of the capability, covert infrastructure, and may affect the success of a mission.

Framework 102 may include an API for CNO applications to easily communicate their state as a heartbeat, current configuration, and any logged data to the framework's command and control components, such as a management application. The management application used by framework 102 can identify deltas and provide a common operating picture of a CNE battle space. In some embodiments, framework 102 utilizes a dispatcher system to provide one frontend to command multiple platform interactive tools.

5. Protection Against Counter-Attacks

Framework 102 mitigates counter-attacks by operating framework components on hardened SELINUX builds. In some embodiments, framework 102 uses policies built on SELINUX to significantly reduce the possibility of a component being compromised. In some embodiments, all communications within framework 102 are encrypted to minimize an attacker's ability to collect information. Protection measures can be taken on low-side 208 by including an automated response system.

6. Provision Test/Cyber-Range Capability

Framework 102 can deploy a test range of environments for capabilities. Testing can occur prior to deploying a capability to ensure that the capability will properly engage with a target computer system. In contrast, conventional systems completely lack an easy way for administrators to deploy and test capabilities. As detailed above, a CNO application can be deployed in its own instance and can be networked in such a way that a user's physical machine is in the same VLAN as the instance. Administrators can deploy multiple instances that each includes a CNO application that represents a specific network setting. Each instance may test the same capability in a different test environment. Testing environments can correspond to IP addresses that are similar to IP addresses of target network computers. Thus, the same capability may be subjected to a range of testing environments that correspond to target network systems. In some embodiments, CNO applications may support cyber range capabilities to include auto-grading and visualization of a network topology.

D. User Roles

Framework 102 provides user roles to designate access rights to individuals of a CNO organization. A CNO organization can assign one or more user roles to an individual to define how that individual can interact with framework 102. For example, users may have permission to view maintain, manage, or monitor framework 102, instance 302, or any other components thereof. User roles may include, for example, administrator, mission manager, auditor and end user. For example, FIG. 3 shows that administrator 306 has exclusive access to configuration service 304. In contrast, end users, mission managers and auditors have limited access to viewer 314 for one or more instances 302. Viewer 314 corresponds to a dedicated user interface for framework 102 or a web portal that is accessible over a network and rendered by a conventional web browser.

In some embodiments, administrator 306 is permitted to configure, deploy, and terminate instances or individual components of VMs. A dedicated user interface or web portal, such as a web interface, may be used by administrator 306 to complete these tasks. In some embodiments, administrator 306 can import and export instance configurations for rapid deployment. In some embodiments, administrator 306 can use configuration service 304 to install components of framework 102, including high side 206 and low side 208. Moreover, configuration service 304 can be used by administrator 306 to populate a CNO application library of framework 102.

In some embodiments, a mission manager has access rights on a per instance basis. For example, a mission manager can configure, deploy, and terminate all components exclusively within instance 302. The mission manager can configure components of instance 302 to meet unique rules for engaging particular clients. These rules may be referred to as rules of engagement (RoE). The mission manager can also upload and deploy CNO applications to instance 302 when needed. In some embodiments, the mission manager can access all tasking services and logging for situational awareness of a particular instance 302. The mission manager may interact with instance viewer 314 to perform these actions over a web interface.

In some embodiments, an auditor has access rights limited to viewing, but not editing, all end user tasking within a particular instance 302. In some embodiments, any tasking that conflicts a mission manager's configured RoE may be highlighted to enable the auditor to readily identify, and address any operational concerns. The auditor may also interact with the instance viewer 314 to perform these actions.

In some embodiments, end users have access rights to task components to accomplish mission goals, but are constrained by a mission manager's RoE and are accountable to auditors. Framework 102 operates transparently to end users because they can only use viewer 314 to task CNO applications within instance 302.

E. Mission Analytics

Mission analytics provide a systematic computational analysis of data collected from offensive computer operations. Mission analytics processes may generate outputs that can be used to create visualizations. Unlike conventional systems, framework 102 can perform analytics across multiple capabilities because data from these capabilities are stored in a common database. Accordingly, framework 102 provides for comprehensive mission analytics. In some embodiments, each instance 302 includes a viewer 314 to visualize mission analytics and for managing capabilities contained in instance 302. Viewer 314 may correspond to, for example, a user interface from a dedicated output or a web portal. A webserver that includes a web portal for viewer 314 may be embedded in an appliance that includes framework 102. The web portal may be accessible over a network and rendered through a conventional web browser.

Viewer 314 can render outputs generated by a set of mission analytics. The outputs may be rendered as charts, such as a pie chart, line or bar chart, graphs, or tables of data to aid a user to quickly understand statuses of CNO capabilities. The outputs can be used to respond to common and complex queries about mission operations. Mission analytics may not necessarily replace analytical CNO applications; instead, they may be included as a component of framework 102 to provide comprehensive monitoring of CNO capabilities and daily operations.

In some embodiments, mission analytics can generate outputs that highlight data values of interest or which exceed designated thresholds. Mission analytics can be scalable to be applied per CNO application, per instance, across multiple CNO applications or instances, across multiple projects or missions, or any combinations thereof. For example, as a user transitions from instance view to group or project view, mission analytics may be scaled to that view of data. Mission analytics may also enable a user to drilldown to analyze a particular capability in detail.

Mission analytics can be configured to output answers to a group or series of queries determined by framework 102. For example, general mission analytics about CNO applications may include a time for deployment, a type, number or frequency of applications executing, not executing, being used or tasked to specific users, or combinations thereof. These and other analytics may be generated across all views. Other analytics include a latency measurement from lowside 208 to acknowledge tasking, status of tasking, volume of callbacks for some or all implants, number of times a service has been interacted with by a target, and access rights and permissions to good and bad locations. Other questions that can be asked across some or all views include identifying an OS or architecture of computers in a view, network source of implant/target, deployed capabilities and their versions, identities of users with particular user roles, and personal security products.

F. Computer Network Operations Applications

CNO applications 104 are utilized by framework 102 to support computer network operations. A library of CNO applications 104 may be stored in a memory of framework 102. CNO applications may include CNE capabilities developed to plug into framework 102. CNO applications can be categorized according to the tasks they perform. For example, categories may include find, breach, collect and analyze. A CNO organization can use these applications to perform OCO such as identifying and searching target computer systems 108, exploiting server or client side programs, deploying a beaconing implant and analyze data collected from target 108.

In some embodiments, framework 102 is extensible to enable third parties to develop unique applications or integrate additional vendor products. For example, tool suites from vendors or industry partners may be integrated into framework 102. In some embodiments, vendors may develop CNO applications that are compatible with framework 102. Although framework 102 is tool agnostic, tools purchased from vendors should conform to standards designated by framework 102.

The following are descriptions of exemplary CNO applications, broken down by categories. CNO applications are not limited to these categories or descriptions. Instead, these categories are meant to show the diversity of capabilities that can be performed by framework 102 according to CNO applications 104, which can be standardized or customized.

A "find" CNO application may perform information gathering about target 108. This type of application may also provide service scanning capabilities, intelligence network route monitoring, and metrics-building for publically exposed services.

A "breach" CNO application may perform server-side or client-side exploitation. These types of capabilities are not tied to any particular exploit or payload. Consequently, they can be used by any exploit to deploy any payload to target 108, according to their design specifications. A server-side breach application may include an integrated rules engine for a mission manager to maintain control of an operation.

A "collect" CNO application may provide a beaconing implant for target 108. For example, this type of application may provide situational awareness of target 108 and deploy follow-on capabilities depending on the situation. In some embodiments, the implant may be modular with plugin architecture to expand its functionality. A collect application may use a broker feature to manage communication with the implants.

An "analyze" CNO application may provide data analysis, visualization and decision-support capability. The capabilities may be performed on CNO datasets of data generated by other CNO applications. Data analyzed and displayed by this type of application includes metadata about an implant status, attributes of target 108, tasking, and the like. This enables an end user to have granular insights into target 108. Further, this type of CNO application may be coupled with a decision-support system. Information input to the decision-support system may be provided according to a rules engine that can alert users about any analytical points-of-interest, warn users of potential risks, and help aid in deploying follow-on capabilities.

A "binary diversification" tool may process a software program to compile it in such a way that its static signature is different from other versions of the same software program. A static signature may be, for example, a hash value. Binary diversification may be used as an anti-forensics technique to help extend a life-cycle of an implant by minimizing the impact of any compromises. In some embodiments, a binary diversification tool of framework 102 may provide binary diversification on a per-instance basis, which can operationally correlate to different targets. A binary diversification process may include techniques such as string munging, flow control alteration, injection of arbitrary data and optimization. This type of application may plug into a build process of capabilities and can provide unique signatures for the capabilities per-instance or across multiple instances.

The embodiments described herein are not an exhaustive representation of possible configurations or uses. Persons skilled in the art would understand that these concepts could be applied to additional systems, devices and methods. The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications, without departing from the spirit and scope of the invention. Thus, this invention is not intended to be limited to the embodiments shown, but is to be accorded the widest scope consistent with the principles and features disclosed herein.

The invention claimed is:

1. A network device, comprising:
   a framework;
   a first network that executes a first virtual environment and that enables bidirectional communications with a first computer of the framework, wherein the first network is an unsecured network;
   a second network that executes a second virtual environment and that enables bidirectional communications with a second computer of the framework, wherein the second network is a secured network; and
   wherein the framework creates a unidirectional communications channel between the first network and the second network, the unidirectional communications channel enabling the first virtual environment to communicate with the second virtual environment,
   wherein the framework utilizes one or more virtual instances to deploy one or more computer applications to the first and second networks,
   wherein the framework is configured to terminate one or more of the one or more computer applications in the first and second networks and deploy one or more updated computer applications to replace the one or more terminated computer applications, the framework being configured to simultaneously perform the termination and deployment, wherein the one or more computer applications and the one or more updated computer applications utilize a common database that stores data related to the one or more computer applications and the one or more updated computer applications, and
   wherein the framework provides for storage of data that are generated by the one or more computer applications deployed to the first and second networks.

2. The network device of claim 1, wherein the unidirectional communications channel comprises:
   a data proxy, and
   a data receiver, wherein the data proxy routes communications to the data receiver.

3. The network device of claim 2, wherein the unidirectional communications channel is a first unidirectional communications channel, the network device comprising:
   a second unidirectional communications channel, wherein the first unidirectional communications channel enables transferring data only from the first network to the second network, and the second unidirectional communications channel enables transferring data only from the second network to the first network.

4. The network device of claim 3, wherein the first and second unidirectional communications channels communicate asynchronously.

5. The network device of claim 4, wherein the first computer resides on a secure network and the second computer resides on an unsecured network.

6. The network device of claim 5, wherein the one or more computer applications comprise:
   a first application that is transmitted from the first computer to the first network and deployed in the first virtual environment, and
   a second application that is transmitted from the first computer to the second network and deployed in the second virtual environment, wherein the second application is transmitted over the first communications channel.

7. The network device of claim 6, wherein the first and second applications are components of a single application.

8. The network device of claim 6, wherein the second application executes actions to monitor network traffic associated with the second computer.

9. The network device of claim 8, wherein the first application obtains data from the second application over the second communications channel and transmits the obtained data to the first computer.

10. The network device of claim 6, wherein the first computer sends an instruction to the second application via the first unidirectional communications channel to monitor network traffic associated with the second computer.

11. The network device of claim 6, wherein the first virtual environment comprises a memory for storing data collected from the second application.

12. The network device of claim 1, wherein the bidirectional communications between the first computer and the first virtual environment is performed while the unidirectional coupling between the first network and the second network is maintained.

13. The network device of claim 1, wherein the second virtual environment obtains a computer application and an instruction to execute the computer application from the first computer.

14. The network device of claim 13, wherein the computer application is designated by a user through a graphical user interface provided by the first virtual environment.

15. The network device of claim 14, wherein the graphical user interface accepts a command to execute the computer application on the second virtual environment.

16. The network device of claim 15, wherein the computer application, when executing on the second virtual environment, performs at least one of identifying the second computer, breaching the second computer, collecting data from the second computer and analyzing data collected from the second computer.

17. The network device of claim 15, wherein the computer application, when running on the second virtual environment, sends a heartbeat signal to the first virtual environment.

18. The network device of claim 17, wherein the first virtual environment provides a web portal displaying a status of the computer application based on the received heartbeat signal.

19. The network device of claim 18, wherein the computer application, when running on the second virtual environment, creates output data that is obtained by the first virtual environment and is stored in a memory at the first virtual environment.

20. The network device of claim 18, wherein the computer application is a first computer application and its output data is a first output data, and wherein the second virtual environment runs a second computer application that creates a second output data, and the first virtual environment obtains the second output data and provides a user interface displaying the first output data and the second output data.

21. The network device of claim 1, wherein the first virtual environment and the second virtual environment are a virtual machine instance provided by a same virtual machine kernel.

22. The network device of claim 1, wherein the framework includes an Application Program Interface (API) configured to allow the one or more computer applications to communicate one or more parameters associated with a state of the computer applications.

23. A system, comprising:
a first network, wherein the first network is an unsecured network;
a second network, wherein the second network is a secured network;
a framework;
wherein the framework creates a first unidirectional communications channel that permits data to pass only from the first network to the second network, and
wherein the framework creates a second unidirectional communications channel that permits data to pass only from the second network to the first network,
wherein data is communicated between two or more virtual machines on the first network and the second network,
wherein the framework utilizes one or more virtual instances to deploy one or more computer applications to the first and second networks,
wherein the framework is configured to terminate one or more of the one or more computer applications in the first and second networks and deploy one or more updated computer applications to replace the one or more terminated computer applications, the framework being configured to simultaneously perform the termination and deployment, wherein the one or more computer applications and the one or more updated computer applications utilize a common database that stores data related to the one or more computer applications and the one or more updated computer applications, and
wherein the framework provides for storage of data that are generated by the one or more computer applications deployed to the first and second networks.

24. The system of claim 23, wherein each virtual machine runs only a single application.

25. The system of claim 23, wherein the first network is a secure network and the second network is an unsecured network.

26. The system of claim 25, wherein a first application deployed by the framework and running on a first virtual machine running on the unsecured network collects data from a remote computer, and a second application deployed by the framework and running on a second virtual machine running on the secure network obtains the collected data from the first application via the second unidirectional communications channel.

27. The system of claim 26, wherein a first computer on the secure network sends an instruction to the first application over the first unidirectional communications channel.

28. The system of claim 23, wherein each virtual machine outputs data that is stored in a common memory.

* * * * *